(12) United States Patent
Filipovich et al.

(10) Patent No.: US 11,392,869 B2
(45) Date of Patent: Jul. 19, 2022

(54) SYSTEMS AND METHODS TO PROVIDE CUSTOMIZED PRODUCT INFORMATION

(71) Applicant: Essilor International, Charenton-le-Pont (FR)

(72) Inventors: Michael A. Filipovich, Dallas, TX (US); Mark Goldman, Dallas, TX (US); Gail Gertken, Dallas, TX (US); Kyle Storkamp, Dallas, TX (US); John Hiemenz, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 737 days.

(21) Appl. No.: 16/327,908

(22) PCT Filed: Sep. 16, 2016

(86) PCT No.: PCT/IB2016/001481
§ 371 (c)(1),
(2) Date: Feb. 25, 2019

(87) PCT Pub. No.: WO2018/051160
PCT Pub. Date: Mar. 22, 2018

(65) Prior Publication Data
US 2019/0188622 A1 Jun. 20, 2019

(51) Int. Cl.
*G06Q 10/06* (2012.01)
*G05B 19/418* (2006.01)
(Continued)

(52) U.S. Cl.
CPC ... *G06Q 10/06315* (2013.01); *G05B 19/4183* (2013.01); *G05B 19/41805* (2013.01);
(Continued)

(58) Field of Classification Search
None
See application file for complete search history.

(56) References Cited

U.S. PATENT DOCUMENTS

| 2005/0055119 A1* | 3/2005 | Yen | G06Q 10/087 700/100 |
| 2005/0246043 A1* | 11/2005 | Pestow | G06Q 10/087 700/101 |

(Continued)

FOREIGN PATENT DOCUMENTS

GB  2 364 797 A  2/2002

OTHER PUBLICATIONS

International Search Report and Written Opinion dated Mar. 28, 2017 in PCT/IB2016/001481 filed Sep. 16, 2016.

*Primary Examiner* — Charles E Anya
(74) *Attorney, Agent, or Firm* — Oblon, McClelland, Maier & Neustadt, L.L.P.

(57) ABSTRACT

The disclosed embodiments include systems and methods to provide customized product information for display. In one embodiment, the system includes a sensor positioned proximate a production line, where the production line is operable to transport an optical product and a product label along the production line, and where the sensor is operable to obtain identification information of the optical product from the product label. The system also includes a storage medium containing product information of the optical product and business rules for providing the product information of the optical product for display. The system further includes a processor operable to determine the identification of the optical product, obtain business rules based on the identification of the optical product, dynamically customize the product information of the optical product based on the business rules, and provide the customized product information for display on an electronic display positioned along the production line.

19 Claims, 6 Drawing Sheets

(51) Int. Cl.
 *G06Q 50/04* (2012.01)
 *G06F 3/0482* (2013.01)

(52) U.S. Cl.
 CPC ........... *G06F 3/0482* (2013.01); *G06Q 10/06* (2013.01); *G06Q 50/04* (2013.01); *G05B 2219/32025* (2013.01); *Y02P 90/02* (2015.11); *Y02P 90/30* (2015.11)

(56) References Cited

U.S. PATENT DOCUMENTS

| | | | |
|---|---|---|---|
| 2006/0120567 A1* | 6/2006 | Kvartler | G02C 9/00 382/111 |
| 2007/0168072 A1 | 7/2007 | Wang | |
| 2007/0204086 A1* | 8/2007 | Jaroszewski | H05K 13/085 710/262 |
| 2015/0154679 A1* | 6/2015 | Fonte | G02C 7/027 351/178 |
| 2015/0288741 A1* | 10/2015 | Stephkov | H04L 67/42 709/217 |
| 2015/0379599 A1* | 12/2015 | Bodell | G06F 30/00 705/26.35 |
| 2018/0067340 A1* | 3/2018 | Chumbley | G02C 7/028 |

* cited by examiner

SYSTEMS AND METHODS TO PROVIDE CUSTOMIZED PRODUCT INFORMATION

BACKGROUND

The present disclosure relates generally to systems and methods to provide customized product information for display.

Product manufacturers sometimes print product information of products being manufactured (processed) on sheets of paper. The number of sheets of paper utilized by these manufacturers on a daily basis is proportional to the number of products processed by the manufacturers. As such, these manufacturers often print thousands of sheets of paper on a daily basis. Sometimes, the product information may contain inaccurate information. Further, the product information of some products may become out-of-date during the manufacturing of the products. As such, additional sheets of paper are printed in order to update the product information of the products. The foregoing process increases product production costs, damages the environment, and slows down production.

Further, each piece of paper has a finite size. As such, only a finite amount of information may be printed on a single sheet of paper. Although the product information may be printed on multiple sheets of paper, this process further increases paper usage. Further, the operator may not be familiar with the formatting of the product information on the paper. As such, the operator may have to expend additional time and effort to locate the desirable product information, which are located on different sections of one sheet of paper or on multiple sheets of paper. Certain sheets of paper may contain sensitive information such as personal or proprietary information of a customer, and may need to be discarded. For example, documents printed for some industries, such as the optical industry, may include information protected under the Health Insurance Portability and Accountability Act (HIPAA). The process to ensure sheets of paper containing sensitive are properly discarded is time consuming, error prone, and further increases production costs. Documents protected under HIPAA guidelines may require that the papers be shredded, which further increases disposal costs and efforts.

BRIEF SUMMARY OF THE DISCLOSED EMBODIMENTS

The disclosed embodiments provide systems and methods to provide customized product information for display. In accordance with one embodiment, a system for providing customized product information for display is provided. The system includes at least one sensor positioned proximate one or more processing points along a production line, the production line being operable to transport an optical product and a product label identifying the optical product along the production line, the at least one sensor being operable to obtain identification information of the optical product from the product label. The system also includes a storage medium comprising product information of the optical product, and a set of business rules for providing and customizing the product information of the optical product for display. The system further includes a processor operable to determine the identification of the optical product. The processor is also operable to obtain one or more business rules of the set of business rules based on the identification of the optical product. The processor is further operable to dynamically customize the product information of the optical product based on the one or more business rules. The processor is further operable to provide the customized product information of the optical product for display on at least one electronic display positioned along the production line and operable to provide product information of the optical product for display.

In accordance with another illustrative embodiment, a method to provide customized product information for display is provided. The method includes determining an identification of an optical product based on a product label of the optical product. The method also includes obtaining a set of business rules for customizing product information of the optical product based on the identification of the optical product and the product label of the optical product. The method further includes applying one or more business rules of the set of business rules to customize the product information of the optical product. The method further includes providing a customized product information of the optical product for display on an electronic display. The method further includes determining a change to the customized product information of the optical product. The method further includes dynamically re-customizing the product information of the optical product. The method further includes providing the re-customized product information of the optical product on the electronic display.

In accordance with a further illustrative embodiment, a non-transitory machine-readable medium including instructions stored therein, which when executed by one or more processors, causes the one or more processors to perform operations to provide product information is provided. The instructions include instructions to determine an identification of each optical lens of at least one optical lens based on a product label associated with said optical lens. The instructions also include instructions to obtain a set of business rules for customizing product information of each optical lens of the at least one optical lens based on the identification of said optical lens. The instructions further include instructions to dynamically customize the product information of each optical lens of the at least one optical lens based on one or more business rules of the set of business rules. The instructions further include instructions to provide a customized product information of each optical lens of the at least one optical lens for display on an electronic display. The instructions further include instructions to determine a change to the customized product information of an optical lens of the at least one optical lens. The instructions further include instructions to dynamically re-customize the product information of the optical lens. The instructions further include instructions to provide the re-customized product information of the optical lens together with a notification of the change to the customized product information on the electronic display.

Additional details of the disclosed embodiments are provided below in the detailed description and corresponding drawings.

BRIEF DESCRIPTION OF THE DRAWINGS

Illustrative embodiments of the present invention are described in detail below with reference to the attached drawing Figures, which are incorporated by reference herein, and wherein.

The illustrated figures are only exemplary and are not intended to assert or imply any limitation with regard to the environment, architecture, design, or process in which different embodiments may be implemented.

DETAILED DESCRIPTION

Figure 1:
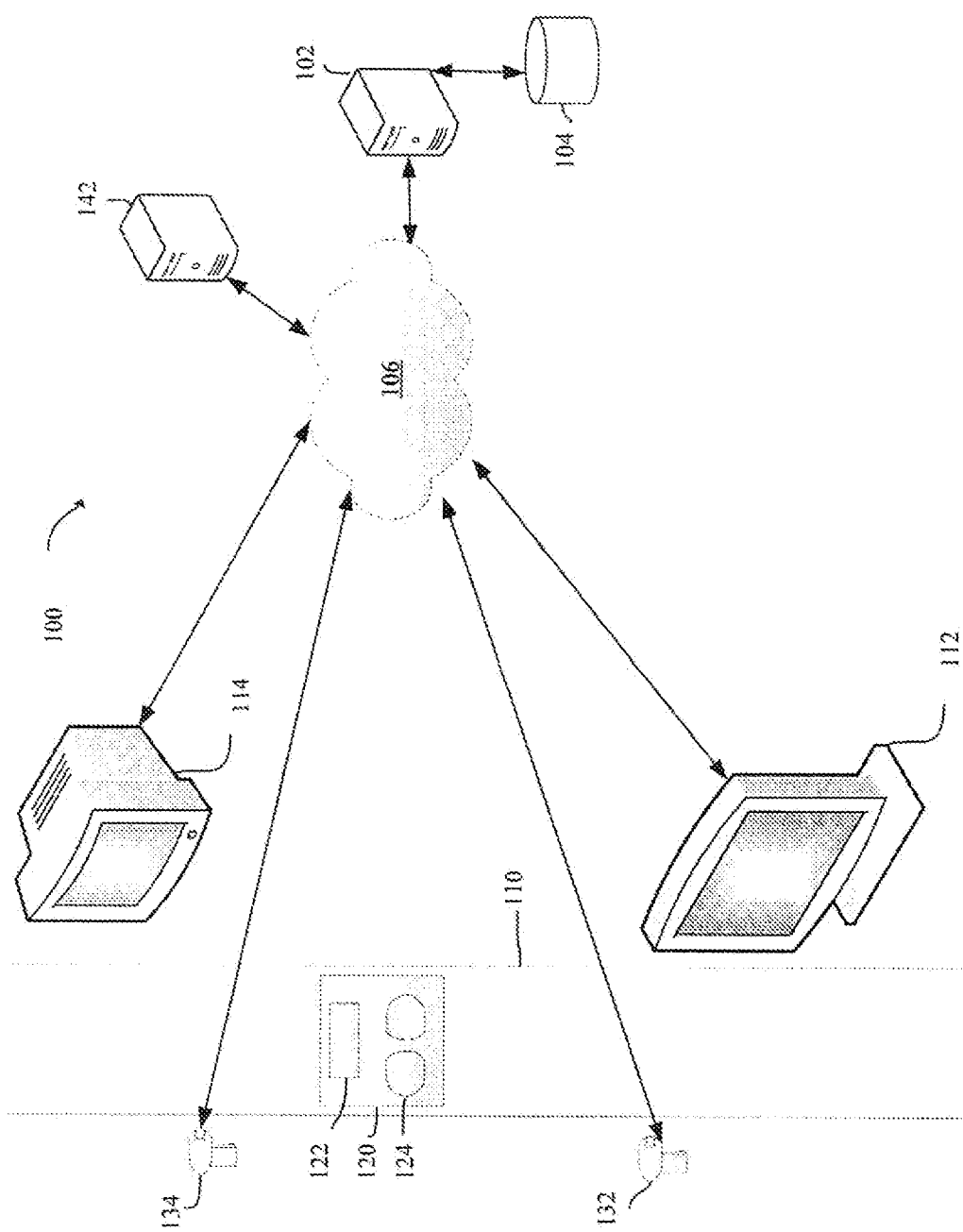
FIG. 1 is a network environment for providing customized product information for display in accordance with one embodiment.

FIG. 1 is a network environment 100 for providing customized product information for display in accordance with one embodiment. The network environment 100 includes a management system 102 that is communicatively connected to a database 104, a first sensor 132, a second sensor 134, a first electronic display 112, a second electronic display 114, and a third party system 142 via network 106. The first and second electronic displays 112 and 114 may be any electronic device having an interface that is operable to provide product information for display on the interface of the electronic device. Examples of electronic displays include liquid crystal displays (LCDs), cathode ray tube (CRT) displays, light-emitting diode (LED) displays, organic light-emitting diode (OLED) displays, plasma display panels (PDP) displays, projection sets, as well as other types of displays that are operable to provide an interface for display product information. The product information may be displayed on the first and second electronic displays 112 and 114 in a variety of formats, such as text based formats, image based formats, audio formats, video formats, multimedia formats, or other types of electronic formats.

The first and second electronic displays 112 and 114 are positioned at different processing points along a production line 110. As defined herein, a production line includes a set of paths a product or components thereof travels on during the manufacturing of the product. The production line 110 may be formed from one continuous production path, or may be formed from multiple non-continuous production paths. In some embodiments, the production line 110 is connected by one or more assembly belts or other mechanisms operable to transport the product and/or components thereof along the production line or between non-continuous production paths. The product may be removed from the production line by operators or by machinery at different processing points of the production line. Moreover, the operators may operate proximate to different processing points of the production line 110 to inspect, assemble, disassemble, perform quality control, or perform other tasks on the product. As shown in FIG. 1, the production line 110 transports a tray 120 carrying a set of optical lenses (a first product) 124 and an identifier 122 of the first product 124.

The management system 102 is also communicatively connected to the first and second sensors 132 and 134, which are deployed at or proximate different processing points along the production line 110. The first and the second sensors 132 and 134 may be any electronic device that is operable to obtain information associated with the identification (identification information) of the first product 124 based on the identifier 122 of the first product 124. Examples of the first and second sensors 132 and 134 may include optical machine-readable representation (barcode) scanners, stock keeping unit (SKU) scanners, near field communication (NFC) detectors, radio frequency identification (RFID) identification detectors, video cameras, optical character recognition (OCR) devices, as well as other similar hardware components operable to obtain the identification information of the first product 124 based on the identifier 122.

In some embodiments, the identifier 122 of the first product 124 is a product label of the first product 122 that may be peeled off the first product 122 or the tray 120. In one of such embodiments, the product label includes a barcode that identifies the first product 124. Further, the first and second sensors 132 and 134 are barcode scanners that are operable to scan the barcode on the product label 122 of the first product 124 to obtain the identification information of the first product 124. In another one of such embodiments, the product label 122 also includes additional information such as the name of the first product 124, the model of the first product 124, the manufacturing date of the first product 124, or other information that may be obtained by the first and second sensors 132 and 134.

The product label 122 may also include additional helpful information, which may be obtained by the first and second sensors 132 and 134, and may be utilized to determine the identification of the customer of the first product 124, the scheduled delivery date of the first product 124, as well as other helpful information related to the first product 124. In further embodiments, the identifier 122 of the first product 124 is an RFID tag having the product identification of the first product 124 as well as helpful information discussed herein stored on the RFID tag. In such embodiments, the first and second sensors 132 and 134 are RFID detectors that are operable to obtain the identification information of the first product 124 from the RFID tag when the RFID tag is proximate to the first and the second sensors 132 and 134, respectively. In further embodiments, the identifier 122 is an NFC tag and the first and second sensors 132 and 134 are NFC detectors that are operable to obtain the identification information of the first product 124 from the NFC tag when the NFC tag is proximate to the first and second sensors 132 and 134, respectively. In further embodiments, the first and second sensors 132 and 134 is another type of sensor disclosed herein that is operable to obtain the identification information of the first product 124 based on the identifier 122 when the identifier is proximate to the first and second sensors 132 and 134, respectively. The identification information of the first product 124 and additional information obtained from the first and second sensors 132 and 134 are transmitted to the management system 102.

The management system 102 may be formed by one or more server computers, desktop computers, laptop computers, tablet devices, smartphone devices, PDAs, similar electronic devices, the combination thereof, or a component thereof having a processor (not shown) and operable to determine the identification of the first product 124, query product information of the first product 124, obtain business rules for customizing the product information of the first product 124, customize the product information of the first product 124, and provide the customized product information of the first product 124 for display on the first and second electronic displays 112 and 114. Additional operations of the processor of the management system 102 are discussed herein and are illustrated in FIGS. 2-5. The management system 102 may be deployed remotely (as shown in FIG. 1), or may be deployed at a location local to the production line 110. In some embodiments, the management system 102 is a built-in component of the first electronic display 112 or the second electronic display 114. In further embodiments, the management system 102 includes one or more electronic displays that may be utilized to display the product information of the first product 124 at a processing point of the production line 110. In further embodiments, the management system 102 also includes one or more sensors such as the first and the second sensor 132 and 134, which are operable to obtain identification information of the first product 124.

The management system 102 determines the identification of the first product 124 based on information obtained from the first or the second sensors 132 or 134. In some embodiments, the management system 102 operates a text recognition application to determine the identification of the first product 124 based on the texts such as barcodes, names, SKUs, or other text elements obtained by the first or the second sensors 132 or 134 to determine the identification of the first product 124. In other embodiments, the management system 102 operates image recognition, video recognition, audio recognition, or other types of recognition applications to determine the identification of the first product 124. In further embodiments, the management system 102 operates the first and second sensors 132 and 134 to determine the identification of the first product 124.

The management system 102 then accesses the storage medium 104 to obtain the product information of the first product 124 and business rules for providing the product information of the first product 124. As defined herein, the business rules are a set of instructions that define the content of the product information, how the product information should be customized, which operators are authorized to view and/or customize the product information, as well as other parameters for providing the product information for display.

The business rules are divided into subsets of business rules (categories), some of which are applicable to the first product 124 to granulize the customization of the product information of the first product 124. A customized product information is defined to mean product information custom generated for a specific operator, for a specific group of operators, to be displayed on a specific electronic display, or to be displayed on a specific group of electronic displays. Examples of subsets of business rules utilized to customize the product information may be based on the product model of the first product 124, the queue position of the first product 124, performance metrics of the operator working on the first product 124, information regarding a customer of the first product 124, instructions from the customer of the first product 124, helpful materials of the first product 124, operator defined customization parameters, as well as other quantifiable categories. For example, if the first product 124 is identified as a first generation model of single vision optical lens (a first model), then the management system 102 obtains business rules associated with customizing the product information of products belonging to the first model, such as the material properties of the first model, the unit cost of the first model, the number of available products belonging to the first model, as well as other information related to the first model.

Certain categories of business rules may be further categorized into different sub-categories of business rules to further granulize the customization of product information of the first product 124. For example, business rules for customizing the product information of the first product 124 based on the operator defined customization parameters are sub-categorized based on the operator's current preferences, the operator's prior preferences, and the credentials of the operator. Further, the operator's current preferences may be sub-categorized into text based preferences, such as font size, font color, font style as well as other text based preferences, image based preferences such as image size, image resolution, image location, as well as other image based preferences, audio preferences such as audio level, background music, notification tones, as well as other audio based preferences, video preferences, as well as other preferences selected by the operator. Additional categories, and levels of sub-categories of business rules utilized to customize the product information of the first product 124 are described in the following paragraphs and are illustrated in FIGS. 2-5. As such, the management system 102 is operable to provide highly granular customizations of the product information of the first product 124 as well as other products identified by the first and second sensors 132 and 134. The management system 102 then provides the customized product information for display on the first and/or second electronic displays 112 and/or 114.

In some embodiments, the management system 102 receives instructions to update the existing product information of the first product 124, which may have become out-of-date. For example, the delivery date of the first product 124 may have been moved up from the originally scheduled delivery date. As such, the queue position of the first product 124 is also changed from the original queue position of the first product 124 to meet the new scheduled delivery date. The management system 102, upon determining that the delivery date and queue position of the first product 124 has changed, obtains business rules that comply with the instructions to update the existing product information of the first product 124. The management system 102 then re-customizes the product information of the first optical product 124 based on the obtained business rules. Continuing with the previous example, the management system 102, upon determining that the delivery date has been moved up, obtains business rules associated with notifying the operator that the delivery date and the queue positions of the first product 124 have changed, and re-customizes the product information of the first product 124 to comply with the obtained business rules to notify the operator.

As the first product 124 travels along the production line 110, the product information of the first product may be displayed on electronic displays having different display dimensions, resolutions, contrasts, as well as other quantifiable display properties. In the example of FIG. 1, the display dimensions of the first electronic display 112 are greater than the display dimensions of the second electronic display 114. In some embodiments, the management system 102 dynamically re-customizes the product information of the first product 124 as the first product 124 travels along the production line 110 to provide the product information of the first product 124 on different electronic displays having different display dimensions. In one of such embodiments, the management system 102 reduces the font and image size of the product information of the first product 124 to fit the product information on an electronic display having smaller display dimensions. In another one of such embodiments, the management system 102 formats the product information such that the entirety of the product information may be accessed on multiple sections, each of which may be accessed by scrolling through the product information or by interacting with selectable tabs. In a further one of such embodiments, the business rules for customizing the product information are weighted and prioritized such that more prioritized product information are displayed over less prioritized product information. For example, business rules associated with providing the queue position of the first product 124 and the customer information of the customer of the first product 124 have higher priority relative to business rules associated with the operator's customization parameters. Additional descriptions of prioritizing certain business rules to display certain product information are provided in the paragraphs below and are further illustrated in FIG. 4.

The storage medium 104 may be formed from data storage components such as, but not limited to, read-only memory (ROM), random access memory (RAM), flash memory, magnetic hard drives, solid state hard drives, CD-ROM drives, DVD drives, floppy disk drives, as well as other types of data storage components and devices. In some embodiments, the storage medium 104 includes multiple data storage devices. In further embodiments, the multiple data storage devices may be physically stored at different locations. The storage medium 104 includes the product information of the first product 124 together with product information of other products that travel along the production line 110. The storage medium 104 also includes business rules for providing the product information of the first product 124 as well as other products that travel along the production line 110. The storage medium 104 further includes instructions, which when performed by a processor, such as the processor of the management system 102, causes the processor to determine an identification of each optical lens of at least one optical lens based on a product label associated with said optical lens, obtain a set of business rules for customizing product information of each optical lens of the at least one optical lens based on the identification of said optical lens, dynamically customize the product information of each optical lens of the at least one optical lens based on one or more business rules of the set of business rules, provide a customized product information of each optical lens of the at least one optical lens for display on an electronic display, determine a change to the customized product information of an optical lens of the at least one optical lens, dynamically re-customize the product information of the optical lens, provide the re-customized product information of the optical lens together with a notification of the change to the customized product information on the electronic display, as well as other operations described herein. Although FIG. 1 illustrates the storage medium 104 is a separate component relative to the management system 102, in some embodiments the storage medium 104 is a component of the management system 102.

In some embodiments, such as the embodiment illustrated in FIG. 1, the management system 102 is also communicatively connected to the third party system 142. The third party system 142 may be formed by one or more third party server computers, desktop computers, laptop computers, tablet devices, smartphone devices, PDAs, similar electronic devices, the combination thereof, or a component thereof having access to certain product information, and being operable to provide such product information of the first product 124 to the management system 102 or the storage medium 104 via the network 106.

In one of such embodiments, the third party system 142 is a server of an optical retailer. The server is operable to access information of clients of the retailer and is further operable to provide such information to the management system 102. For example, the optical retailer is an optometrist practice that provides optical products to patients of the optometrist practice. When a patient provides the optometrist practice with a pair of glasses with one damaged lens, information about the patient's damaged glasses is provided to the server. The server, upon receiving the information about the patient's lens, is operable to dynamically provide the information to the management system 102. The management system 102 is operable to perform operations described herein to produce a replacement product (replacement lens). The management system 102 is further operable to customize the production process of the replacement lens based on the information provided by the server. Continuing with the foregoing example, the information about the patient's glasses contains information related to the lens, an indication that the patient's lens frame will be delivered at a designated time, and instructions to assemble the lens onto the lens frame. The management system 102, upon receipt of the information, initiates production of the replacement lens, and sets the queue position of the replacement lens to ensure completion of the replacement lens by the time the patient's lens frame is delivered.

The management system 102 may also dynamically adjust the queue position based on information related to the lens. Continuing with the foregoing example, if the information related to the lens contains a tracking number that is indicative of the delivery time of the lens frame, the management system 102 is operable to determining the delivery time, and dynamically re-adjust the queue position of the lens to ensure that the lens is processed before the delivery time. Further, the management system 102 is also operable to dynamically adjust the queue position based on information obtained from the third party system 142. Similarly, the management system 102 may also periodically receive up-to-date information from the third party system 142 and dynamically update the queue position based on the most recent information received from the third party system 142.

In another one of such embodiments, the third party system 142 is a server of a third party vendor, such as a material vendor that supplies materials used to manufacture the first product 124. The management system 102 is operable to dynamically determine whether a threshold amount of materials for processing the first product 124 is available and communicate with the third party system 142 to order additional materials if the amount of available materials falls below the threshold. The management system 102 is further operable to provide up-to-date information related to the availability of the materials for display on at least one of the first and second electronic displays 112 and 114. For example, the management system 102 is operable to determine, based on tracking information provided by the third party system 142, the estimate arrival time of the materials, the current location of the materials, as well as other delivery information, and provide up-to-date information about the materials for display. Although the foregoing paragraphs provides a few examples of the third party system 142, one or ordinary skill would recognize that the third party system 142 may represent additional third party systems. The management system 102 is operable to communicate with the third party system 142 to obtain up-to-date product information and to provide up-to-date product information to the third party systems 142.

The network 106 can include, for example, any one or more of a cellular network, a satellite network, a personal area network (PAN), a local area network (LAN), a wide area network (WAN), a broadband network (BBN), the Internet, and the like. Further, the network 106 can include, but is not limited to, any one or more of the following network topologies, including a bus network, a star network, a ring network, a mesh network, a star-bus network, tree or hierarchical network, or similar network architecture. In some embodiments, the network 106 includes a wired or wireless networking device (not shown) operable to facilitate communication between the management system 102, the first and second electronic displays 112 and 114, and the first and second sensors 132 and 134. Examples of the networking device include, but are not limited to, wired and wireless routers, wired and wireless modems, access points, as well as other types of suitable networking devices described herein.

Although FIG. 1 illustrates a single management system 102 that is communicatively connected to the first and second electronic displays 112 and 114, and to the first and second sensors 132 and 134 via the network 106, additional management systems (not shown), additional electronic displays (not shown), and additional sensors (not shown) may also be communicatively connected to the management system 102 via the network 106. Further, although certain paragraphs herein describe optical products, in particular different makes and models of optical lenses, one of ordinary skill would understand that the systems and methods described herein are operable to provide customized product information of different kinds of products (both optical and non-optical) for display.

Figure 2:
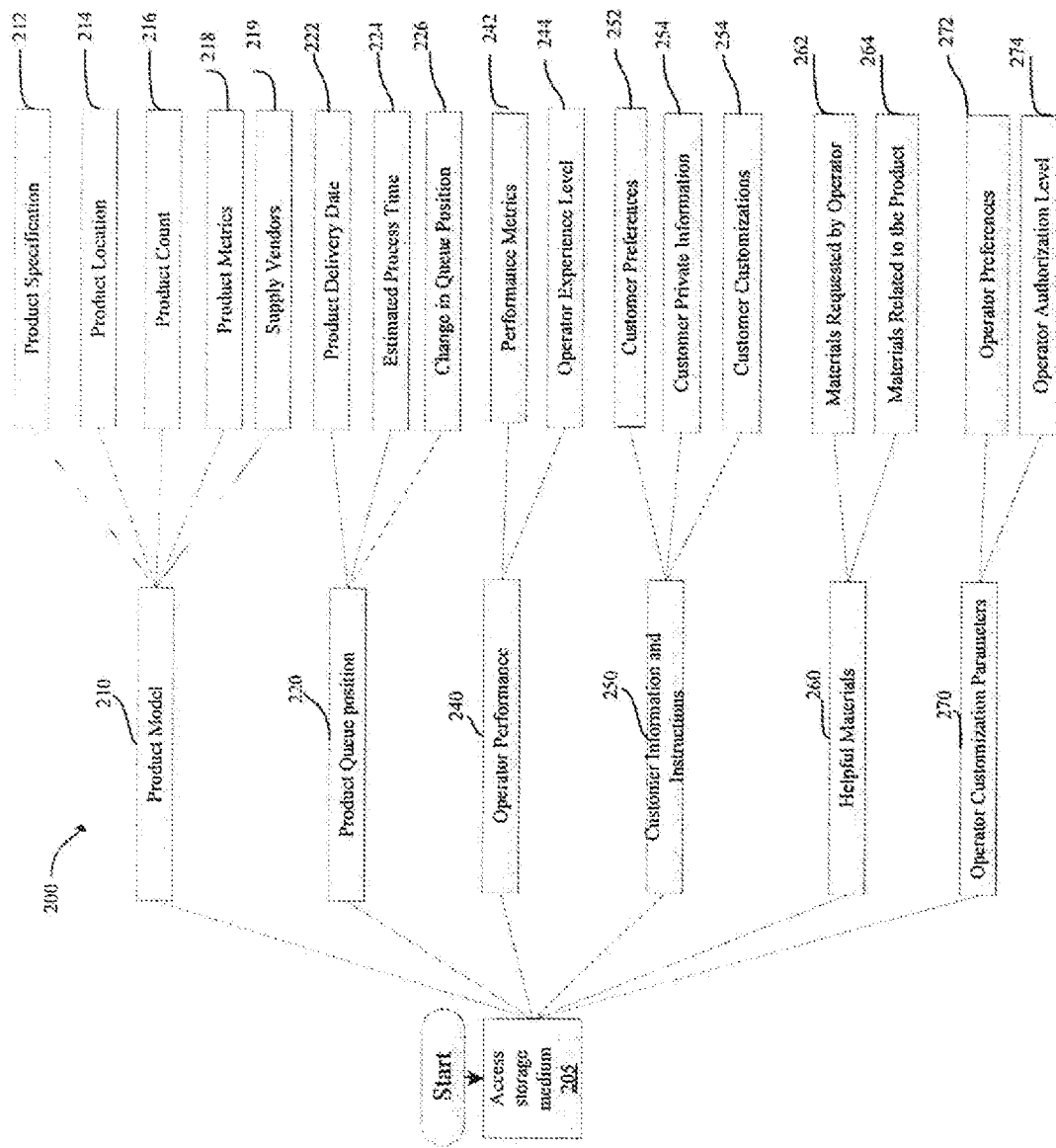
FIG. 2 is a tree diagram illustrating a process to obtain business rules to provide customized product information in accordance with one embodiment.

FIG. 2 is a tree diagram 200 illustrating a process to obtain business rules to provide customized product information of the first product 124 in accordance in accordance with one embodiment. Although operations in the process 200 are shown in a particular sequence, certain operations may be performed in different sequences or at the same time where feasible. Further, although the operations describe obtaining business rules to provide the customized product information of the first product 124 for display on the first electronic display 112, the operations may also be performed to obtain customized product information of other products described herein and to provide the customized product information for display on other electronic displays. Further, in some embodiments, different combinations of some or all of the steps of the process 200 are performed to obtain the business rules to customize the product information of the first product 124.

As stated herein, the business rules are instructions that define the content of the product information of products such as the first product 124 and how to customize the product information of the products. The business rules for customizing the product information of the first product 124 are stored in the storage medium 104 and are categorized into different categories, such as a product model category, a product queue position category, an operator performance category, the customer information and instructions category, helpful materials category, and an operator customization category. At step 205, the processor, upon determining the identification of the first product 124, accesses the storage medium 104 to obtain applicable business rules to provide the customized product information of the first product 124 for display on the first electronic display 112. At step 210, the processor accesses the product model category to obtain business rules for providing product information of the first product 124 based on the product model of the first product 124. The product model category is further divided into sub-categories to provide more granular categorization of business rules that should be applied to customize the product information of the first product 124. At step 212, the processor accesses the product specification sub-category to determine applicable product specification business rules. Examples of product specification business rules include business rules that define how to provide and/or to customize product information related to the material properties of products belonging to the first model, the product dimensions of the first product 124, the product cost of the products belonging to the first model, as well as other product information that are related to the product specification of the products belonging to the first model.

At step 214, the processor determines business rules associated with the product location of the first product 124. Examples of these business rules include business rules that define providing information on where the products belonging to the first model are stored, information on nearby facilities that store the products belonging to the first model, and business rules that specify whether to generate a notification if less than a threshold number of the products belonging to the first model are stored at a specific local facility. At step 216, the processor determines business rules associated with the product count of the products belonging to the first model. For example, these business rules include rules that define generating one or more types of notifications for display based on the current product count of the products belonging to the first model, providing information on the number of incoming orders of the products belonging to the first model within a specific operational duration, such as a day, a week, a month, or another quantifiable period of time, providing interactive reports of the product count of the first product 124 over a prior operational duration as well as other business rules associated with providing and customizing product information related to the product count of the products belonging to the first model.

At step 218, the processor determines product metrics associated with the first model and accesses the product metrics sub-category to determine business rules for providing and customizing product information of the first product 124 based on product metrics of the products belonging to the first model. In some embodiments, the product metrics sub-category includes business rules that define providing and/or customizing information and notifications based on the number of breakages of the products belonging to the first model, the cost of the breakages, as well as other quantifiable metrics of the breakage count of the products belonging to the first model. For example, if the product breakage count of all products belonging to the first model is less than a first threshold breakage value or is less than a first threshold breakage rate within an operational duration, then the product information is customized to include information about the breakage count. However, if the product breakage count of all products belonging to the first model is greater than a second threshold breakage value or is greater than a second threshold breakage rate within the operational duration, then the product information is customized to include a video of how to properly handle the first product 124 together with information about the breakage count. The threshold breakage values and rates may be predetermined by the operator or by an authorized personnel to vary based on the type of the product, the cost of the product, as well as other quantifiable factors. As such, product information related to the breakage count of products belonging to different models may be individually customized to provide additional granularity.

At step 219, the processor determines vendors that supply materials used to manufacture products belonging to the first model (material vendors) and accesses the material vendors sub-category to determine business rules for providing and customizing product information of the first product 124 based on information provided by the material vendors. In some embodiments, the material vendors sub-category includes business rules that define providing and/or customizing up-to-date information related to the estimated delivery date of the materials, the current location of the materials, carrier information, as well as other information related to the materials used to manufacture the products belonging to the first model. The business rules also define providing up-to-date information about the current inventory of materials to the material vendors and dynamically ordering additional materials from the material vendors when the inventory of the materials drop below a threshold value.

At step 220, the processor accesses the product queue position category to determine business rules for providing and customizing product information of the first product 124 based on the product queue position of the first product 124. The product queue position category includes business rules for providing and customizing product information related to the product delivery date, estimated process time, as well as changes to the current queue position of the first product 124. At step 222, the processor accesses the product delivery date sub-category. In some embodiments, the product delivery date sub-category includes business rules that define providing and/or customizing one or more types of notifications based on the proximity of the product delivery date. For example, if the product delivery date is more than one month away, then the business rules may specify that the product delivery date is provided for display on the first electronic display 112. However, if the product delivery date is less than one week away, then the business rules specify that a notification of the upcoming product delivery date should also be provided for display on the first electronic display 112. In some embodiments the notification requires the operator to acknowledge that operator has received the notification by interacting with the notification, such as by clicking on a user selectable tab. As such, different business rules may be applicable based on the product delivery date of the first product 124.

At step 224, the processor accesses the estimated process time sub-category. The estimated process time sub-category, similar to the product delivery date subcategory, also includes business rules that define providing and customizing information and notifications based on the estimated duration of the process time. At step 226, the processor accesses the change in queue position sub-category upon determining that the queue position of the first product 124 has changed. In some embodiments, the change in queue position sub-category includes business rules that define providing and customizing different types of notifications based on the magnitude of the change in the queue position. For example, if the magnitude of the change in queue position is smaller than a first threshold, such as less than 5 positions, then the product information is customized to include a notification of the change in queue position of the first product 124, the original queue position of the first product 124, and the current queue position of the first product 124. However, if the change in queue position is greater than a second threshold, such as greater than 10 positions, then the product information is customized to include a different notification that requires the operator to acknowledge receipt of the notification. In some embodiments, the change in queue position sub-category also includes business rules for customizing the product information to include instructions and notifications related to expediting the manufacturing of the first product 124 to accommodate the change in the queue position.

At step 240, the processor accesses the operator performance category to determine business rules for providing and customizing product information of the first product 124 based on the operator's performance history. In some embodiments, the operator performance category includes business rules for providing and customizing product information based on the operator's past performance, level of experience, level of training, as well as other quantifiable measurements of the operator's performance. At step 242, the processor obtains a set of performance metrics of the operator and accesses the operator performance sub-category based on the performance metrics. Examples of the operator's performance metrics include the number of products belonging to the first model that the operator successfully processed, the total number of products successfully processed by the operator, the number of breakages of products belonging to the first model that are attributed to the operator, the total number of products processed by the operator that subsequently failed quality control, as well as other quantifiable metrics indicative of the operator's performance. The operator performance sub-category includes business rules for providing and customizing product information based on the foregoing operator performance metrics as well as other operator performance metrics discussed herein.

At step 244, the processor accesses the operator experience level sub-category. The operator experience level sub-category includes business rules that provide and customize notifications, training exercises, and helpful materials that the operator may view based on the relevant experience level of the operator. For example, if the operator is a new employee, then the business rules may specify that the operator should review relevant safety materials prior to working on the production line 110. To the contrary, if the operator has many years of experience, and has no recent history of product breakage, then the business rules may specify that information related to the operator's history should not be provided for display. In some embodiments, the operator experience level sub-category also includes business rules that provide notification, training exercises, and helpful materials based on the level of training the operator has recently received. For example, if the operator has already viewed a first training video out of two training videos, then the business rules may specify that only the second training video should be provided for display on the first electronic display 112.

At step 250, the processor accesses the customer information and instructions category to determine business rules for providing and customizing product information of the first product 124 based on information and instructions of the customer of the first product 124. The customer information and instructions category includes business rules for providing and customizing product information based on the identity of the customer, prior information about the customer, as well as specific instructions from the customer. At step 252, the processor accesses the customer preferences sub-category. The customer preferences sub-category includes business rules that define providing and/or customizing information and notifications based on the customer's current preferences. In some embodiments, the customer preferences sub-category includes business rules that customize the product information to include packaging information, delivery information, carrier information, as well as other information based on the customer's preferences. The business rules may also customize the product information to include the customer's prior order history as well as other quantifiable customer history information for display for the operator to review. For example, if the customer has previously ordered another product belonging to the first model, and requested for the other product to be boxed a gift box, the business rules may also customize the product information of the first product 124 to notify the operator about the customer's prior request.

At step 254, the processor accesses the customer private information sub-category. The customer private information sub-category includes business rules that customize the product information to include the customer's private information. Moreover, the business rules may customize the customer's private information based on the type of private information, the level of authorization the operator has to access the private information as well as other customer privacy related factors disclosed herein. For example, the business rules may define that certain types of private information, such as information covered under HIPAA require additional authentication to access. The business rules may also define that such information may only be viewed by certain operators having sufficient authorization, whereas private information related to the customer's address may be viewed by operators that have less authorization. Further, the business rules may also restrict all customer private information from being viewed on any electronic display that is deployed in high traffic areas or areas that have low levels of restrictive access.

At step 256, the processor accesses the customer customizations sub-category. The customer customizations sub-category includes business rules that customize the product information to include information related to customer specified customizations, parts used for such customizations, the current location of such parts, estimated time of delivery of such parts, as well as other information related to the customer's customization of the first product 124. For example, the business rules may define that the first product 124 should be fit on a particular frame, the estimated time such frame would be delivered, the name of the carrier responsible for the delivery, as well as other information related to such frame. The business rules also include rules for providing up-to-date information of the information related to such frame for display on the first electronic display 112.

At step 260, the processor accesses the helpful materials sub-category to determine business rules for providing and customizing product information of the first product 124 based on accessible helpful materials. The helpful materials category includes business rules for providing and customizing product information based on materials that are related to the first product 124, materials requested by the operator, as well as other types of materials that may facilitate the manufacturing of the first product 124. At step 262, the processor accesses a sub-category containing business rules that customizes the product information with materials requested by the operator. At step 264, the processor accesses a sub-category containing business rules that customizes the product information with materials related to the first product 124.

At step 270, the processor accesses the operator customization category to determine business rules for providing and customizing the product information of the first product 124 based on operator specified customization parameters. The operator customization category includes business rules that customize the operator's personal preferences with respect to the content of product information. The business rules also customize the product information to include additional items that are not related to the first product 124, such as a background image selected by the operator. At step 272, the processor accesses the operator preferences sub-category. The operator preferences sub-category includes business rules that customize the product information based on the operator's preferences. In some embodiments, the business rules customizing the product information based on the operator's preferred display settings, the operator's preferred volume settings, the operator's preferred text format for the product information, the operator's preferred image format for the product information, as well as other operator preferences described herein. In some embodiments, the business rules also customize the product information to include non-product related content selected by the operator to be displayed on the first electronic display 112.

At step 274, the processor accesses the operator authorization level sub-category. The operator authorization level sub-category includes business rules that define the amount of customization the operator is permitted to make based on the operator's credentials. For example, the business rules may specify that a newly hired operator having basic credentials is not allowed to customize how the product information is displayed, whereas an operator with management level credentials is authorized to customize the product information to remove certain content from the product information.

In some embodiments, certain business rules for providing and customizing the product information supersede other business rules for providing and customizing the product information. In one of such embodiments, customer instructions regarding the first product 124 supersedes all other business rules for providing the product information of the first product 124. In some embodiments, different business rules for providing and for customizing the product information are ranked or weighted in order of priority. In one of such embodiments, business rules related to the customer's instructions are ranked highest priority, business rules related to the product queue position of the first product 124 are ranked second highest priority, business rules related to the operator's customization parameters are ranked the lowest priority, and other business rules are ranked in between. In some embodiments, the processor may simultaneously proceed through multiple steps of the process 200. As such, the process 200 allows the processor to efficiently determine applicable business rules for providing customized product information.

Although the foregoing paragraphs describe performing the process 200 to customize the first product 124, the process 200 may be repeated for each product on the production line 110. In some embodiments, the processor may simultaneously perform the process 200 on multiple products. As such, customized product information of each product traveling along the production 110 may be provided for display on the first and second electronic displays 112 and 114 as well as other electronic displays communicatively connected to the management system 102.

Figure 3A:
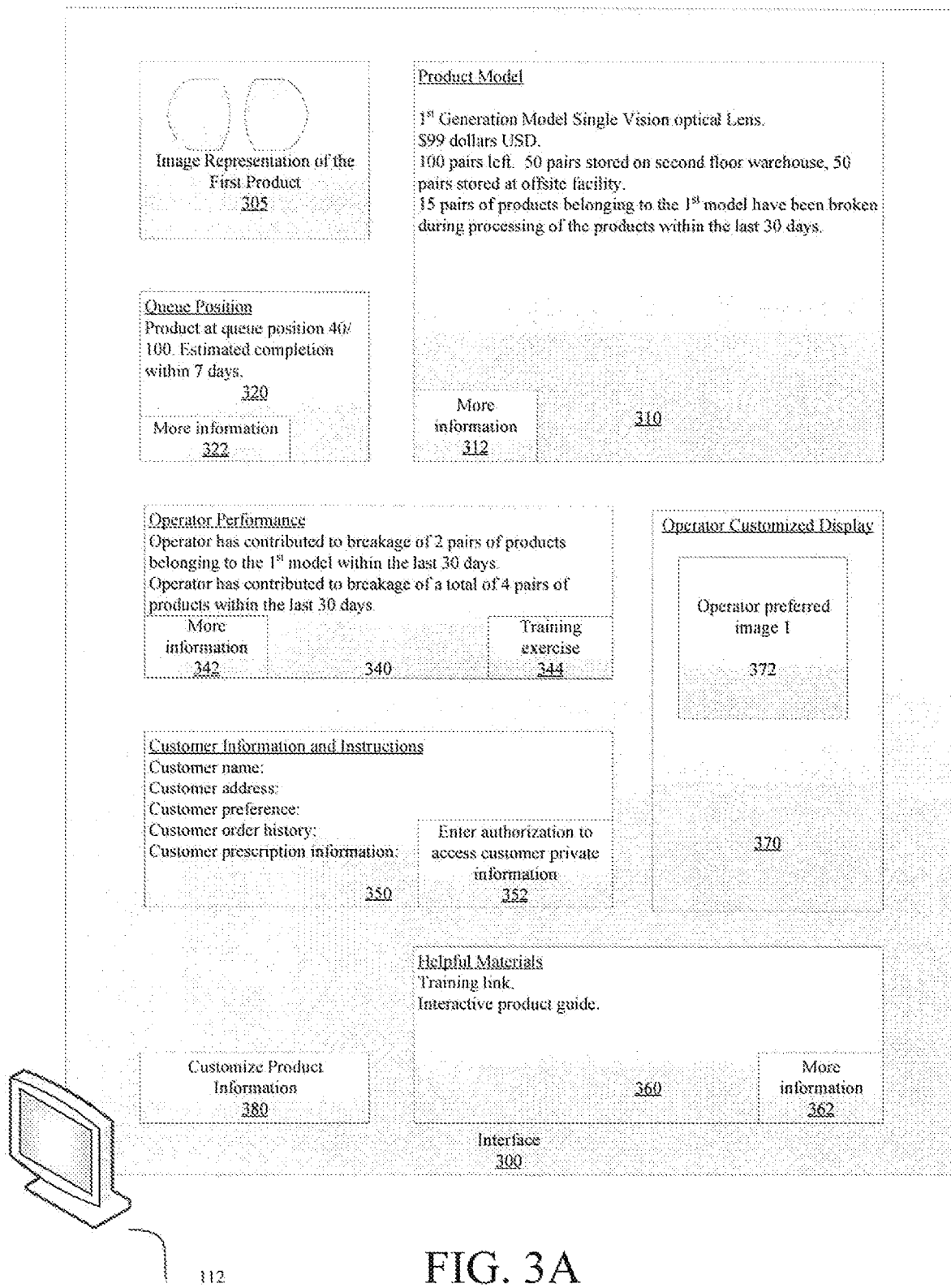
FIG. 3A is a schematic view of a first interface displaying customized product information of a first product on a first electronic display in accordance with one embodiment.

FIG. 3A is a schematic view of a first interface 300 displaying customized product information of the first product 124 on the first electronic display 112 in accordance with one embodiment. The processor, upon customizing the product information of the first product 112, transmits the customized product information to the first electronic display 112, where the customized product information is provided for display on the first interface 300 of the first electronic display 112.

The customized product information of the first product 124 includes an image representation 305 of the first product 124 and is divided into multiple information segments 310, 320, 340, 350, and 360. As illustrated in FIG. 3, the information segments 310, 320, 340, 350, and 360 include a product model segment 310 containing information related to the product model of the first product 124, a queue position segment 320 containing information related to the queue position of the queue position of the first product 124, an operator performance segment 340 segment containing information related to the operator performance, a customer information and instructions segment 350 containing information related to the customer of the first product 124, and a helpful materials segment 360 containing information related to materials that may helpful to the operator.

In some embodiments, the customized product information included in the information segments are generated by the processor during different steps in the process 200 and illustrated in FIG. 2. For example, the customized product information in product model segment 310 is generated by the processor at steps 210, 212, 214, 216, and 218 of the process 200. As shown in FIG. 3A, the customized product model segment 310 includes information related to the first model, the unit cost of the first product, the number of available products belong to the first model, and a breakage count of products belonging to the first model within the operational duration. The processor is operable to dynamically re-customize product information included in the product model segment 310 to provide up-to-date product information of each product traveling along the production line 110. In some embodiments, not all of the product information related to the product model the first product 124 is displayed at once. In such embodiments, a user selectable tab (information tab 312) is provided for display with the product segment 310. The operator may interact with the information tab 312 to obtain additional information related to the first model.

The queue position segment 320, similar to the product model segment 310, also provides customized information related to the queue position of the first product 124. In some embodiments, customized product information related to the queue position of the first product 124 is generated by the processor during steps 220, 222, 224, and 226 of the process 200. As shown in FIG. 3A, the first product 124 is currently at queue position 40 out of 100 and that the estimated completion date of the first product 124 is within 7 days. As the information related to the queue position of the first product 124 changes, the processor is further operable to dynamically obtain the most up-to-date queue position of the first product 124, and to customize the queue position segment 320 with the most up-to-date product information related to the queue position of the first product 124. Further, a user selectable information tab 322 is also provided for display with the queue position segment 320. The operator may interact with the information tab 322 to obtain additional information about the queue position of the first product 124.

The operator performance segment 340 provides customized information related to various operator performance metrics. In some embodiments, the processor is operable to perform the operations described in steps 240, 242, and 244 of the process 200 to dynamically customize information specific to the operator. As shown in FIG. 3A, the operator has contributed to the breakage of two products belonging to the first model within the last 30 days and has contributed to the breakage of a total of four products within the last 30 days. A user selectable information tab 342 and a user selectable training exercise tab 344 are provided for display with the operator performance segment 340. The user may interact with the tabs 342 and 344 to obtain more information about past breakages as well as view training materials.

The customer information and instructions segment 350 provides up-to-date information related to the customer's information, preferences, as well as instructions. As shown in FIG. 3A, the customer's name, address, preferences, order history, as well as prescription information are provided in this information segment 350. In some embodiments, some of the customer's information (customer private information) may require credentials to access. As defined herein, private information includes any information that may not be freely displayed on all of the electronic displays deployed along the production line 110. In one of such embodiments, a user selectable authorization requirement tab 352 may be provided for display on the customer information and instructions segment 350. The operator may access the customer's private information upon entering appropriate credentials. In another one of such embodiments, the processor is operable to dynamically provide the authorization requirement tab 352 based on the location of the electronic display 108. For example, the business rules described herein includes a business rule that customizes this information segment 350 with the authorization requirement tab 352 if the electronic display 112 is deployed in a high traffic area. In another one of such embodiments, the first and second sensors 132 and 134 are operable to determine the identification of the operator. The processor is operable to dynamically determine, based on the identity of the operator, the level of credentials the operator has, and dynamically customize this information segment 350 with customer information the operator is authorized to access.

The helpful materials segment 360 provides materials that may help the operator to increase productivity, reduce breakage count, obtain additional information about the first product 124 or about other products, as well as other helpful materials. Helpful materials may be provided in different file formats such as text based documents, images, audio files, video files, as well as other file types. In some embodiments, the helpful materials are customized based on the identity of the operator. In one of such embodiments, the first and second sensors 132 and 134 are each operable to determine the identity of the operator, and the processor is operable to customize materials helpful for the operator. As such, the processor is operable to provide different helpful materials to different operators. In some embodiments, the operator may interact with a user selectable information tab 362 to obtain additional helpful materials or to browse through a catalog of helpful materials. Although FIG. 3A illustrates providing a product model segment 310, a queue position segment 320, an operator performance segment 340, a customer information and instructions segment 350, and a helpful materials segment 360, the processor is operable to combine one of or more of the foregoing information segments, to include additional product information segments, or to customize the product information in other ways described herein.

The first interface 300 also includes operator customized displays 370. The operator customized displays may include file content, such as text-based files, image files, audio files, video files, multimedia files, and similar file types, specified by the operator to be provided for display. As shown in FIG. 3A, the operator customized displays 370 includes a first operator preferred image 372. The processor is operable to provide different operator customized displays 370 for display on the first electronic display 112 to different operators based on the identities of the operators. For example, the processor is operable to provide different operator customized displays to different operators.

Although the information segments 310, 320, 340, 350, and 360, and the operator customized displays 370 illustrated in FIG. 3A are positioned at certain locations of the first interface 300, one of ordinary skill would understand that the relative positions of these information segments 310, 320, 340, 350, and 360, and the operator customized displays 370 shown in FIG. 3A are merely illustrative, and that the information segments 310, 320, 340, 350, and 360, and the operator customized displays 370 may be displayed on a variety of different locations on the first interface 300 and may take on a variety of dimensions. For example, the first operator preferred image 372 may be a background image that covers the entirety of the first interface 300. Further, as discussed herein, the processor is also operable to dynamically customize the relative positions of one or more of the information segments 310, 320, 340, 350, and 360, and the operator customized displays 370 based on a variety of factors, including the display dimensions of the electronic display, the preferences of the operator, the amount of information related to one or more of the information segments 310, 320, 340, 350, and 360, and the operator customized displays 370, as well as other factors discussed herein.

The first interface 300 also includes a selectable tab (display customization tab 380) that permits the operator to customize the product information segments 310, 320, 340, 350, and 360 as well as the operator customized displays 370. The operator may select the display customization tab 380 to specify one or more operator specified customization parameters discussed herein to customize information displayed on the first interface 300. The processor is operable to re-customize information displayed on the first interface 300 based on the operator specified customization parameters.

Figure 3B:
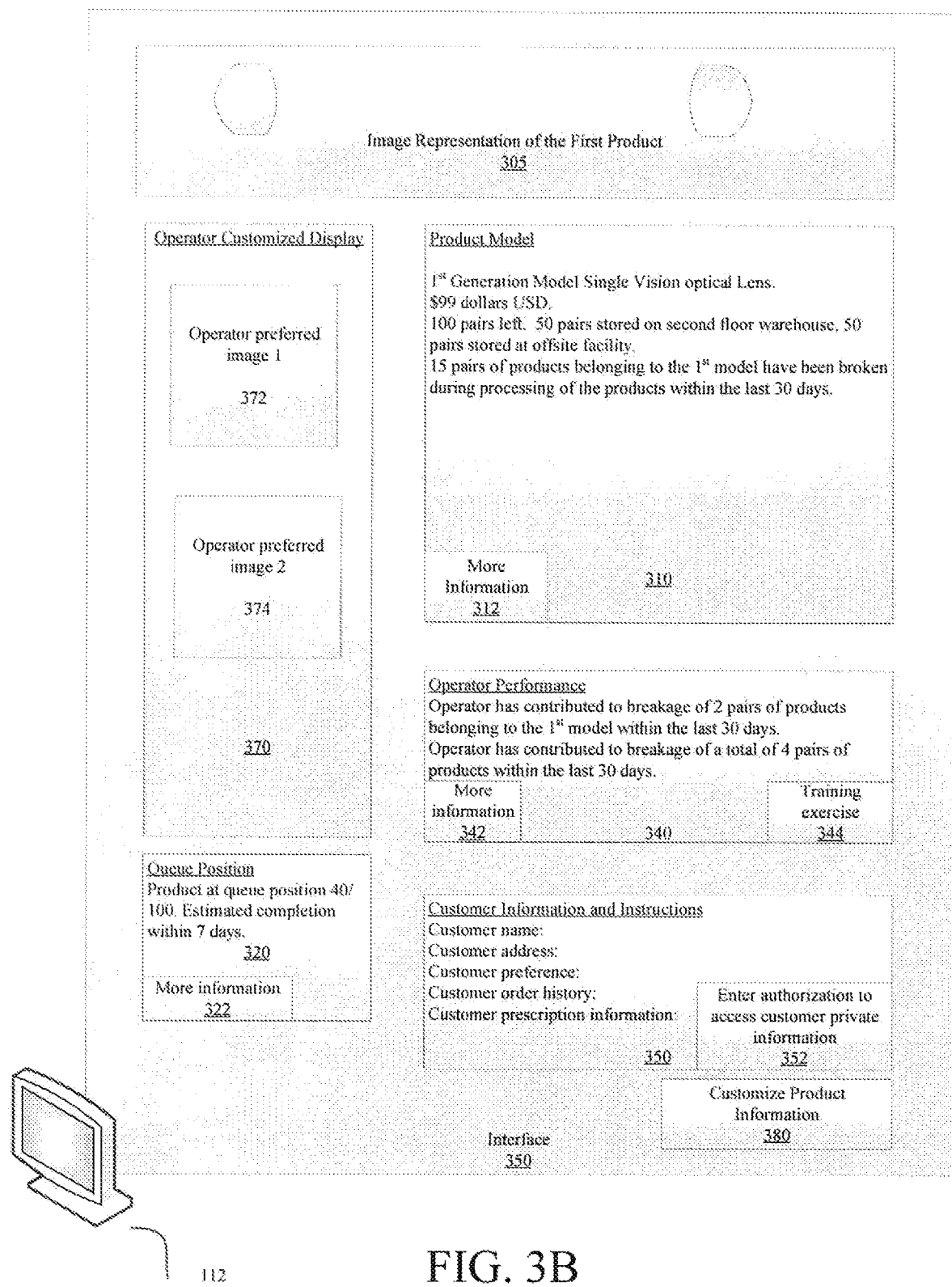
FIG. 3B is another schematic view of the first interface displaying re-customized product information of the first product on the first electronic display in accordance with one embodiment.

FIG. 3B is another schematic view of the first interface 300 displaying re-customized product information of the first product 124 on the first electronic display 112 in accordance with one embodiment. The position of the operator customized displays 370 as shown in FIG. 3B is different from the position of the operator customized displays shown in FIG. 3A. Further, the image representation 305 of the first product has been enlarged. Further, the helpful materials segment 360 has been removed. The processor is operable to perform additional customizations of the product information based on the operator specified customization parameters discussed herein, the credentials of the operator, the display dimensions of the electronic display, as well as other factors discussed herein. In some embodiments, the operator may also customize the product information to correct inaccuracies and to update the storage medium 104 with more up-to-date product information. In some embodiments, the operator is restricted from customizing certain pieces of product information or product information segments without proper authorization. In one of such embodiments, the operator is restricted from customizing information related to the operator's performance without receiving authorization from an authorized personnel.

Figure 4:
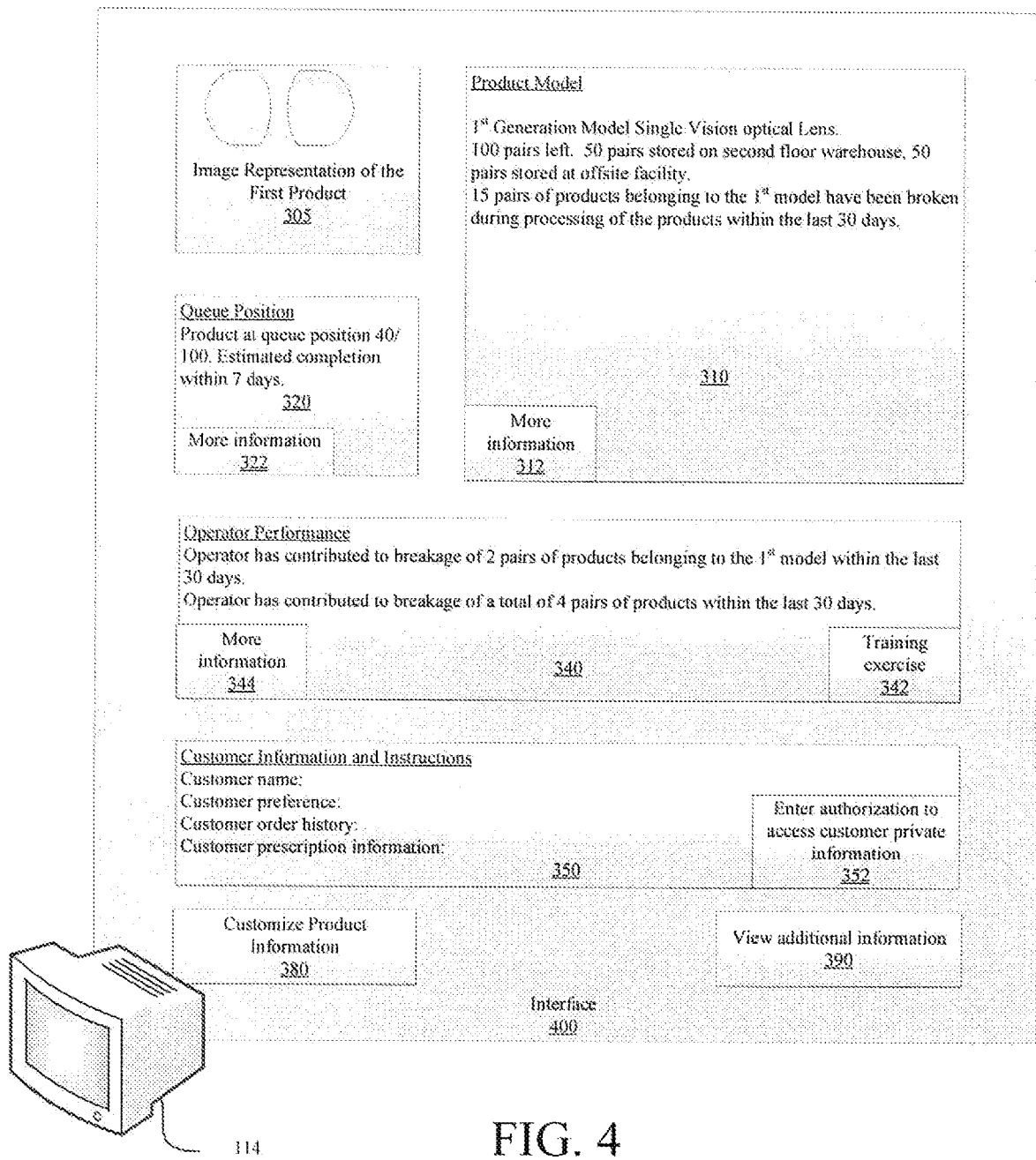
FIG. 4 is a schematic view of a second interface displaying re-customized product information of the first product on a second electronic display in accordance with one embodiment.

FIG. 4 is a schematic view of a second interface 400 displaying re-customized product information of the first product 124 on the second electronic display 114 in accordance with one embodiment. As the first product 124 travels along the production line 110, different electronic displays deployed along the production line 110 may have different display dimensions. The display dimensions of the second electronic display 114 are smaller than the display dimensions of the first electronic display 112. As such, less product information may be displayed on the second electronic display. As discussed herein, the processor is operable to determine the display dimensions of the second display 114, and dynamically re-customize the product information of the first product 124. In some embodiments, the processor assigns a priority score to each information segment and to the operator customized displays. For example, of the customer information and instructions segment 350 has the highest priority score followed by the product queue segment 320, the product information segment 310, the operator performance segment 340, the helpful materials segment 360, and the operator displays 370, in a decreasing order. As such, the helpful materials segment 360 and the operator displays 370 are not displayed on the second electronic display 114 in order to ensure that the product information related to the information segments having the highest priority scores are displayed. In other embodiments the processor assigns a priority score for each individual piece of information. For example, with respect to information related to the product model segment 310, the name of the product model is assigned the highest priority, followed by the availability of products belonging to the first model, the breakage count of products belonging to the first model within the operational duration, and the cost of the first model, in a decreasing order. The cost of the first model is not displayed on the second interface 400 in order to ensure higher prioritized pieces of information are displayed. A user selectable tab to view additional information (additional information tab 390) is provided on the second interface 400. In some embodiments, the operator may interact with the additional information tab 390 to access information not displayed on the second electronic display 114 due to the display dimensions of the second electronic display 114.

Figure 5:
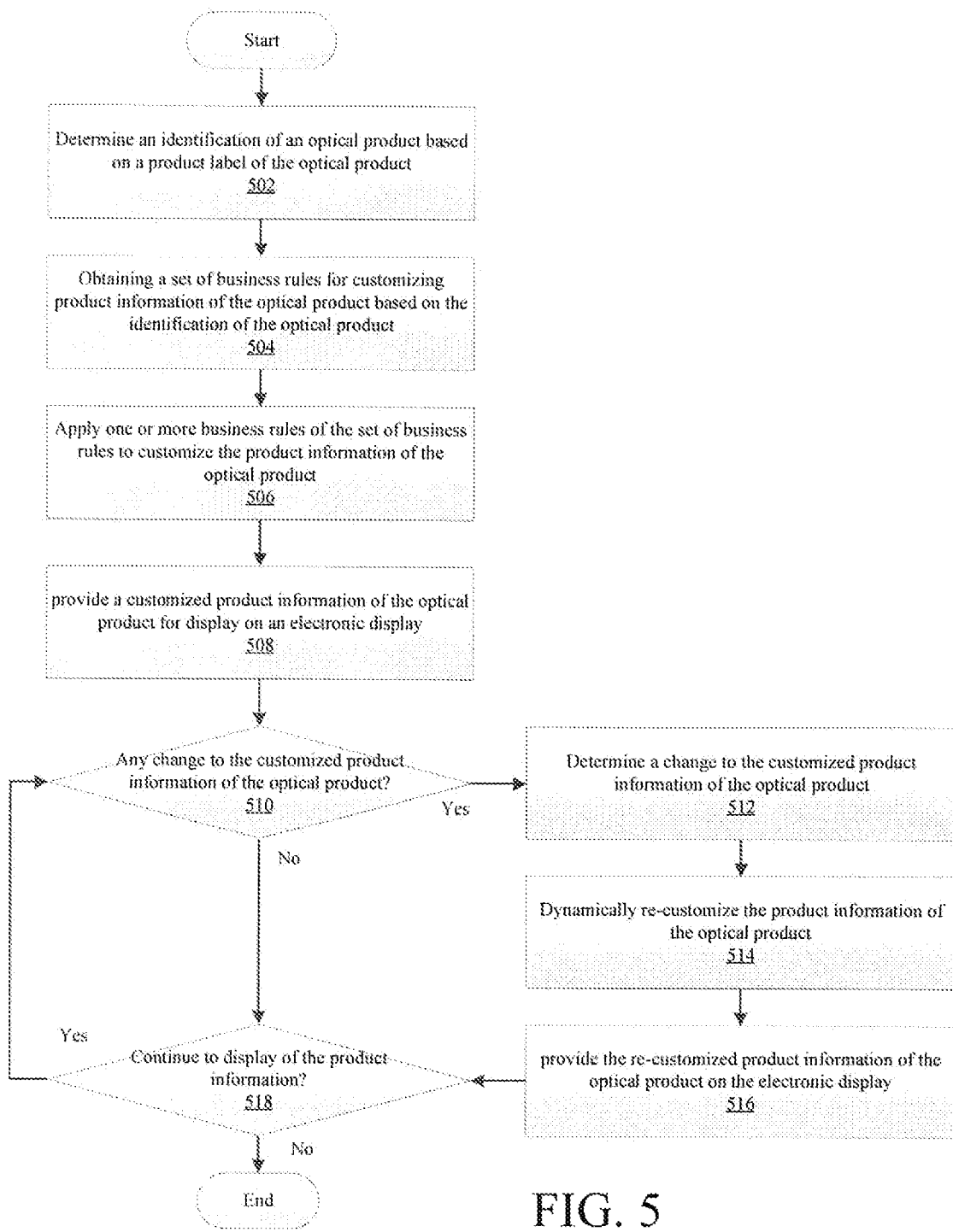
FIG. 5 is a flowchart illustrating a process to provide customized product information for display in accordance with one embodiment.

FIG. 5 is a flowchart illustrating a process 500 to provide customized product information for display in accordance with one embodiment. Although operations in the process 500 are shown in a particular sequence, certain operations may be performed in different sequences or at the same time where feasible. Further, although the following paragraphs describe performing the process 500 to provide product information of an optical product for display, the process 500 may also be performed to provide product information of non-optical products for display on an electronic display.

The process 500 starts when an identifier of an optical product is identified by a sensor. In an embodiment disclosed herein, the identifier is a product label of the optical product, and the sensor is a barcode scanner operable to scan information from the product label. The barcode scanner is also operable to provide the scanned information to the management system 102.

At step 502, the processor of the management system 102 or another electronic device operable to perform the operations of process 500 determines the identification of the optical product based on the product label of the optical product. In some embodiments, the processor is operable to utilize text and image recognition applications to determine the identity of the optical product from scanned information containing the identification of the optical product. At step 504, the processor obtains a set of business rules for customizing product information of the optical product based on the identification of the optical product. At step 506, the processor applies one or more business rules of the set of business rules to customize the product information of the optical product. In some embodiments, the processor performs one or more steps described in the process 200 to obtain the business rules and the customize the product information based on the obtained business rules. The product information may be individually customized based on the identity of the operator, the location of the electronic display, the display dimensions of the electronic display as well as other factors described herein. Examples of customized product information of the optical product are illustrated in FIGS. 3A, 3B, 4. At step 508, the processor provides a customized product information of the optical product for display on an electronic display. The processor then waits for change to the customized product information of the optical product.

At step 510, the processor identifies whether any change to the product information of the optical product has occurred. In some embodiments, the processor is operable to periodically perform this operation to ensure the product information is up-to-date and that no change to any of the product information has occurred. The processor continues to step 512 if the processor identifies that a change to the customized product information of the optical product. At step 512, the processor determines the actual change to the customized product information of the optical product. The process then proceeds to step 514, and the processor dynamically re-customizes the product information of the optical product to update the product information. At step 516, the processor provides the re-customized product information of the optical product for display on the electronic display. The process then proceeds to step 518 and the process determines whether the electronic display should continue to display the product information. If the process determines that the product information of the optical lens should be maintained, then the process returns to step 510 and the processor determines if there is any change to the product information of the optical product. Alternatively, if the processor determines that there has not been any change to the product information of the optical product, then the process proceeds to step 518, and process determines whether the product information displayed on the electronic displace should be maintained. The process ends if the processor determines at step 518 not to continue to display of the product information.

As used in this specification and any claims of this application, the terms "computer", "server", "processor", and "memory" all refer to electronic or other technological devices. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

The above disclosed embodiments have been presented for purposes of illustration and to enable one of ordinary skill in the art to practice the disclosed embodiments, but is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/blocks may be performed in parallel or out of sequence, or combined into a single step/block. The scope of the claims is intended to broadly cover the disclosed embodiments and any such modification. Further, the following clauses represent additional embodiments of the disclosure and should be considered within the scope of the disclosure:

Clause 1, a system for providing product information for display, comprising at least one sensor positioned proximate one or more processing points along a production line, the production line being operable to transport an optical product and a product label identifying the optical product along the production line, the at least one sensor being operable to obtain identification information of the optical product from the product label, a storage medium comprising, product information of the optical product, and a set of business rules for providing and customizing the product information of the optical product for display, and a processor operable to determine the identification of the optical product, obtain one or more business rules of the set of business rules based on the identification of the optical product, dynamically customize the product information of the optical product based on the one or more business rules, and provide the customized product information of the optical product for display on at least one electronic display positioned along the production line and operable to provide product information of the optical product for display.

Clause 2, the system of clause 1, wherein the processor is further operable to determine a change to the product information of the optical product; dynamically re-customize the product information of the optical product; and provide the re-customized product information of the optical product for display on the at least one electronic display.

Clause 3, the system of clause 1 or 2, wherein a sensor of the at least one sensor is a barcode scanner positioned along the production line, and wherein the barcode scanner is operable to automatically scan the product label to obtain the identification of one optical product.

Clause 4, the system of at least one of clauses 1-3, wherein the set of business rules comprises rules for displaying product condition of the optical product, customer instructions of one or more customers of the optical product, customer information of one or more customers of the optical product, and helpful materials related to the optical product.

Clause 5, the system of at least one of clauses 1-4, wherein the processor is further operable to determine a product condition of the optical product; and select one or more business rules of the set of business rules based on the product condition of the optical product, wherein the one or more selected business rules are utilized by the processor to dynamically customize product information of the optical product.

Clause 6, the system of claim 1, wherein the processor is further operable to determine a product model the optical product belongs to; obtain a first set of product metrics of products belonging to the product model; and select one or more business rules based on the first set of product metrics, wherein the one or more selected business rules are utilized by the processor to dynamically customize product information of the optical product.

Clause 7, the system of at least one of clauses 1-5, wherein the one or more selected business rules comprises a business rules for providing and a breakage count of optical products belonging to the product model within an operational duration, a breakage count of all optical products processed within the operational duration, and identities of operators responsible for breakage of optical products belonging to the product model within the operational duration.

Clause 8, the system of at least one of clauses 1-7, wherein the processor is further operable to identify a first operator operating on the at least one optical product; obtain a first set of performance metrics of the first operator; and select one or more business rules of the set of business rules based on the first set of performance metrics, wherein the one or more selected business rules are utilized by the processor to dynamically customize product information of the optical product.

Clause 9, the system of at least one of clauses 1-8, wherein the first set of performance metrics comprises metrics of a product breakage count attributed to the first operator within an operational duration, a number of optical products successfully processed by the first operator within the operational duration, a number of optical products processed by the first operator that failed quality control, a level of experience of the first operator, and a level of training of the first operator has received.

Clause 10, the system of at least one of clauses 1-9, wherein the processor is further operable to identify a queue position of the optical product; and select a first subset of business rules of the set of business rules based on the queue position of the optical product, wherein the first subset of business rules is utilized by the processor to dynamically customize product information of the optical product.

Clause 11, the system of claim at least one of clauses 1-10, wherein the processor is further operable to dynamically determine a change in the queue position of the optical product; and select a second subset of the set of business rules based on the change in queue position of the optical product, wherein the second subset of the set of business rules are utilized by the processor to dynamically re-customize the product information of the optical product.

Clause 12, the system of at least one of clauses 1-11, wherein the processor is further operable to receive instructions to update the product information of the optical product as displayed on a first electronic display; determine one or more that complies with the instructions to update the product information of the optical product; re-customize the product information based on the one or more business rules; and provide the re-customized product information for display on the first electronic display.

Clause 13, the system of at least one of clauses 1-12, wherein the processor is further operable to: determine dimensions of a first electronic device display; and prioritize information segments of the product information to display higher prioritized information segments on the first electronic device display, wherein the customized product information comprises the prioritized information segments.

Clause 14, a computer-implemented method to provide product information for display, the method comprising determining an identification of an optical product based on a product label of the optical product; obtaining a set of business rules for customizing product information of the optical product based on the identification of the optical product; applying one or more business rules of the set of business rules to customize the product information of the optical product; providing a customized product information of the optical product for display on an electronic display; determining a change to the customized product information of the optical product; dynamically re-customizing the product information of the optical product; and providing the re-customized product information of the optical product on the electronic display.

Clause 15, a non-transitory machine-readable medium comprising instructions stored therein, which when executed by one or more processors, causes the one or more processors to perform operations comprising determining an identification of each optical lens of at least one optical lens based on a product label associated with said optical lens; obtaining a set of business rules for customizing product information of each optical lens of the at least one optical lens based on the identification of said optical lens; dynamically customizing the product information of each optical lens of the at least one optical lens based on one or more business rules of the set of business rules; providing a customized product information of each optical lens of the at least one optical lens for display on an electronic display; determining a change to the customized product information of an optical lens of the at least one optical lens; dynamically re-customizing the product information of the optical lens; and providing the re-customized product information of the optical lens together with a notification of the change to the customized product information on the electronic display.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

The invention claimed is:

1. A system for providing customized product information for display, comprising:
  at least one sensor positioned proximate one or more processing points along a production line, the production line being operable to transport an optical product and a product label identifying the optical product along the production line, the at least one sensor being operable to obtain identification information of the optical product from the product label;
  a storage medium comprising:
    product information of the optical product; and
    a set of business rules for providing and customizing the product information of the optical product for display; and
  a processor operable to:
    determine the identification of the optical product;
    obtain one or more business rules of the set of business rules based on the identification of the optical product;
    dynamically customize the product information of the optical product based on the one or more business rules; and
    provide the customized product information of the optical product for display on at least one electronic display positioned along the production line and operable to provide product information of the optical product for display,
  wherein the processor is further operable to:
    identify a queue position of the optical product; and
    select a first subset of business rules of the set of business rules based on the queue position of the optical product, and
  wherein the first subset of business rules is utilized by the processor to dynamically customize product information of the optical product.

2. The system of claim 1, wherein the processor is further operable to:
- determine a change to the product information of the optical product;
- dynamically re-customize the product information of the optical product; and
- provide the re-customized product information of the optical product for display on the at least one electronic display.

3. The system of claim 1, wherein a sensor of the at least one sensor is a barcode scanner positioned along the production line, and wherein the barcode scanner is operable to automatically scan the product label to obtain the identification of one optical product.

4. The system of claim 1, wherein the set of business rules comprises rules for displaying product condition of the optical product, customer instructions of one or more customers of the optical product, customer information of one or more customers of the optical product, and helpful materials related to the optical product.

5. The system of claim 4, wherein the processor is further operable to:
- determine a product condition of the optical product; and
- select one or more business rules of the set of business rules based on the product condition of the optical product,
- wherein the one or more selected business rules are utilized by the processor to dynamically customize product information of the optical product.

6. The system of claim 1, wherein the processor is further operable to:
- determine a product model the optical product belongs to;
- obtain a first set of product metrics of products belonging to the product model; and
- select one or more business rules based on the first set of product metrics,
- wherein the one or more selected business rules are utilized by the processor to dynamically customize product information of the optical product.

7. The system of claim 6, wherein the one or more selected business rules comprises a business rules for providing and a breakage count of optical products belonging to the product model within an operational duration, a breakage count of all optical products processed within the operational duration, and identities of operators responsible for breakage of optical products belonging to the product model within the operational duration.

8. The system of claim 1, wherein the processor is further operable to:
- identify a first operator operating on the at least one optical product;
- obtain a first set of performance metrics of the first operator; and
- select one or more business rules of the set of business rules based on the first set of performance metrics,
- wherein the one or more selected business rules are utilized by the processor to dynamically customize product information of the optical product.

9. The system of claim 8, wherein the first set of performance metrics comprises metrics of a product breakage count attributed to the first operator within an operational duration, a number of optical products successfully processed by the first operator within the operational duration, a number of optical products processed by the first operator that failed quality control, a level of experience of the first operator, and a level of training of the first operator has received.

10. The system of claim 1, wherein the processor is further operable to:
- dynamically determine a change in the queue position of the optical product; and
- select a second subset of the set of business rules based on the change in queue position of the optical product,
- wherein the second subset of the set of business rules are utilized by the processor to dynamically re-customize the product information of the optical product.

11. The system of claim 1, wherein the processor is further operable to:
- receive instructions to update the product information of the optical product as displayed on a first electronic display;
- determine one or more that complies with the instructions to update the product information of the optical product;
- re-customize the product information based on the one or more business rules; and
- provide the re-customized product information for display on the first electronic display.

12. The system of claim 1, wherein the processor is further operable to:
- determine dimensions of a first electronic device display; and
- prioritize information segments of the product information to display higher prioritized information segments on the first electronic device display,
- wherein the customized product information comprises the prioritized information segments.

13. A computer-implemented method to provide customized product information for display, the method comprising:
- determining an identification of an optical product based on a product label of the optical product;
- obtaining a set of business rules for customizing product information of the optical product based on the identification of the optical product;
- identifying a queue position of the optical product;
- selecting a first subset of business rules of the set of business rules based on the queue position of the optical product;
- applying one or more business rules of the set of business rules to customize the product information of the optical product;
- providing a customized product information of the optical product for display on an electronic display;
- determining a change to the customized product information of the optical product;
- dynamically re-customizing the product information of the optical product; and
- providing the re-customized product information of the optical product on the electronic display,
- wherein the first subset of business rules is utilized to dynamically customize product information of the optical product.

14. The method of claim 13, further comprising:
- determining a product model to which the optical product belongs;
- obtaining a first set of product metrics of products belonging to the product model; and
- selecting one or more business rules based on the first set of product metrics,
- wherein the one or more selected business rules are utilized to dynamically customize product information of the optical product.

15. The method of claim 14, wherein the one or more selected business rules include business rules for providing and a breakage count of optical products belonging to the product model within an operational duration, a breakage count of all optical products processed within the operational duration, and identities of operators responsible for breakage of optical products belonging to the product model within the operational duration.

16. The method of claim 13, further comprising:
identifying a first operator operating on the optical product;
obtaining a first set of performance metrics of the first operator; and
selecting one or more business rules of the set of business rules based on the first set of performance metrics,
wherein the one or more selected business rules are utilized to dynamically customize product information of the optical product.

17. The method of claim 16, wherein the first set of performance metrics include metrics of a product breakage count attributed to the first operator within an operational duration, a number of optical products successfully processed by the first operator within the operational duration, a number of optical products processed by the first operator that failed quality control, a level of experience of the first operator, and a level of training of the first operator has received.

18. The method of claim 13, further comprising:
dynamically determining a change in the queue position of the optical product; and
selecting a second subset of the set of business rules based on the change in queue position of the optical product,
wherein the second subset of the set of business rules are utilized to dynamically re-customize the product information of the optical product.

19. A non-transitory machine-readable medium comprising instructions stored therein, which when executed by one or more processors, causes the one or more processors to perform operations comprising:
determining an identification of each optical lens of at least one optical lens based on a product label associated with said optical lens;
obtaining a set of business rules for customizing product information of each optical lens of the at least one optical lens based on the identification of said optical lens;
identifying a queue position of the optical product;
selecting a first subset of business rules of the set of business rules based on the queue position of the optical product;
dynamically customizing the product information of each optical lens of the at least one optical lens based on one or more business rules of the set of business rules;
providing a customized product information of each optical lens of the at least one optical lens for display on an electronic display;
determining a change to the customized product information of an optical lens of the at least one optical lens;
dynamically re-customizing the product information of the optical lens; and
providing the re-customized product information of the optical lens together with a notification of the change to the customized product information on the electronic display,
wherein the first subset of business rules is utilized to dynamically customize product information of the optical product.

* * * * *